(12) United States Patent
Jamil et al.

(10) Patent No.: US 7,120,755 B2
(45) Date of Patent: Oct. 10, 2006

(54) TRANSFER OF CACHE LINES ON-CHIP BETWEEN PROCESSING CORES IN A MULTI-CORE SYSTEM

(75) Inventors: Sujat Jamil, Chandler, AZ (US); Quinn W. Merrell, Fort Collins, CO (US); Cameron B. McNairy, Fort Collins, CO (US)

(73) Assignee: Intel Corporation, Santa Clara, CA (US)

( * ) Notice: Subject to any disclaimer, the term of this patent is extended or adjusted under 35 U.S.C. 154(b) by 561 days.

(21) Appl. No.: 10/039,060

(22) Filed: Jan. 2, 2002

(65) Prior Publication Data

US 2003/0126365 A1    Jul. 3, 2003

(51) Int. Cl.
  *G06F 12/08*    (2006.01)
(52) U.S. Cl. .................. 711/141; 711/119; 711/120; 711/124; 711/146
(58) Field of Classification Search ................ 711/119, 711/120, 124, 141, 146
See application file for complete search history.

(56) References Cited

U.S. PATENT DOCUMENTS

| | | | | |
|---|---|---|---|---|
| 5,895,487 A | * | 4/1999 | Boyd et al. | 711/122 |
| 6,292,872 B1 | * | 9/2001 | Arimilli et al. | 711/146 |
| 6,587,926 B1 | * | 7/2003 | Arimilli et al. | 711/122 |
| 2002/0023794 A1 | * | 2/2002 | Pierce et al. | 180/170 |
| 2002/0184546 A1 | * | 12/2002 | Sherburne, Jr. | 713/322 |
| 2003/0023794 A1 | * | 1/2003 | Venkitakrishnan | 710/105 |
| 2004/0039880 A1 | * | 2/2004 | Pentkovski et al. | 711/146 |
| 2004/0260879 A1 | * | 12/2004 | Barroso et al. | 711/122 |

* cited by examiner

*Primary Examiner*—Jack A. Lane
(74) *Attorney, Agent, or Firm*—Blakely, Sokoloff, Taylor & Zafman LLP (57) ABSTRACT

Cache coherency is maintained between the dedicated caches of a chip multiprocessor by writing back data from one dedicated cache to another without routing the data off-chip. Various specific embodiments are described, using write buffers, fill buffers, and multiplexers, respectively, to achieve the on-chip transfer of data between dedicated caches.

13 Claims, 9 Drawing Sheets

TRANSFER OF CACHE LINES ON-CHIP BETWEEN PROCESSING CORES IN A MULTI-CORE SYSTEM

BACKGROUND OF THE INVENTION

1. Field of the Invention

The invention pertains generally to computers. More particularly, the invention pertains to cache coherency in a chip multiprocessor.

2. Description of the Related Art

Multi-core computer architecture typically includes multiple processors on a single chip, referred to as a chip multiprocessor (CMP), and the chip also includes cache memory (referred to simply as 'cache'). Each processor has its own dedicated on-chip cache memory for fast access to the code being executed and the data being operated upon. The chip typically also has another level of cache that is shared by all the processors, and at least one additional level of memory exists off-chip (either main memory or a higher level of common cache) that serves as a uniform data source for the on-chip cache. Each processor may modify a cache line within its own dedicated cache by writing to one or more locations within its own dedicated cache. However, if multiple processors are operating with the same cache line, one processor may modify the cache line in its own dedicated cache while the same cache line in other dedicated caches remains unchanged. This creates a problem with cache coherency—not all dedicated caches will have the latest version of the cache line. To maintain cache coherency, whenever a processor requests data from a cache line that has been modified in another processor's cache, the requesting processor's cache must also be modified to bring it up to date before the requested cache line is read and used.

Traditional multi-core systems maintain cache coherency by updating a common memory source that is off-chip, such as main memory, and then updating the requesting processor's cache line from the common memory source. Because transferring data to/from off-chip circuits is so much slower than on-chip transfers, this slows down cache-coherency updates, and negates some of the speed benefit of using on-chip cache memories.

BRIEF DESCRIPTION OF THE DRAWINGS

The invention may best be understood by referring to the following description and accompanying drawings that are used to illustrate embodiments of the invention. In the drawings.

DETAILED DESCRIPTION OF THE INVENTION

Various embodiments of the invention update the contents of a first dedicated cache of a first processor with the previously modified contents of a second dedicated cache of a second processor, without the first dedicated cache having to receive the updated information from off-chip. In the following description, numerous specific details are set forth to provide a thorough understanding of the invention. However, it is understood that the invention may be practiced without these specific details. In other instances, well-known circuits, structures and techniques have not been shown in detail in order not to obscure the invention.

Within this specification, the term "data" includes program data, instructions, and any other forms of information that may be transferred between the indicated units. Although the descriptions contained herein refer to a dedicated cache being connected to various devices and data being written into and out of a dedicated cache, one of skill in the art will appreciate that in some embodiments the associated processor provides an intermediate connection and the data is transferred to/from a processor on its way in/out of the dedicated cache.

Figure 1:
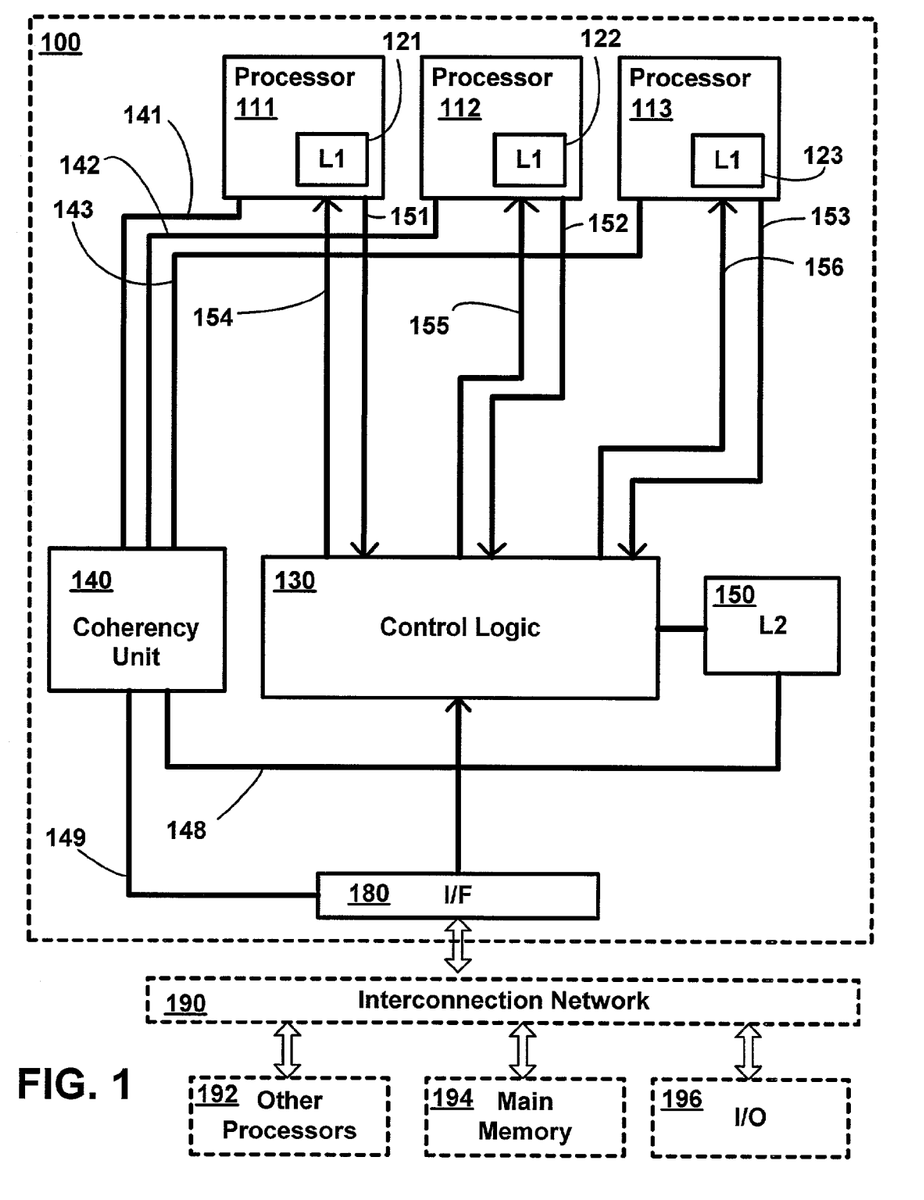
FIG. 1 shows a block diagram of a multi-core system, according to one embodiment of the invention.

FIG. 1 shows a block diagram of a multi-core system according to one embodiment of the invention. In the context of the invention, a core includes a processor and a dedicated cache associated with the processor. In the illustrated embodiment of FIG. 1, CMP 100 includes three individual processors 111–113 with dedicated caches 121–123, respectively, control logic 130, coherency unit 140, shared cache 150, and interface (I/F) 180 to off-chip devices. FIG. 1 also shows exemplary off-chip devices that may be included in a system and connected to CMP 100 through I/F 180, such as an interconnection network 190 to connect CMP 100 to other processors 192, main memory 194, and input/output (I/O) devices 196. One skilled in the art will appreciate that the off-chip devices in a system may differ from those shown without deviating from the scope of the invention.

Although three processors 111–113 are shown, one skilled in the art will appreciate that the invention may incorporate 2, 4, 5 or more processors arranged in a similar manner. The illustrated processors 111–113 each include a dedicated cache 121–123, respectively. In FIG. 1, each processor has a single level of dedicated cache labeled 'L1' and shared cache 150 has a single cache level labeled 'L2'. In other embodiments, each dedicated cache 121–123 and/or shared cache 150 includes multiple cache levels.

In some embodiments, the data in each of dedicated caches 121–123 and shared cache 150 includes instructions. While in one embodiment the instructions in the dedicated caches 121–123 are program instructions and follow program order, in another embodiment the dedicated caches 121–123 are trace caches and contain instructions or micro-instructions that follow the execution order.

In one embodiment, the coherency unit 140 is coupled to dedicated caches 121–123 with probe lines 141–143, respectively, to shared cache 150 with probe line 148, and to main memory 194 through probe line 149. (Note: Although various signal paths are referred to as probe lines, write-back lines, and supply lines, one of skill in the art will appreciate that these signal paths may take any convenient form, including but not limited to: 1) a single signal line, 2) multiple parallel signal lines, 3) a bus, etc.) Coherency unit 140 performs snoop functions over the probe lines to determine which of the above caches and main memory contain the same cache lines, which of those same cache lines have been modified, and which have not been modified. In this manner, coherency unit 140 may determine which caches contain cache lines with the latest version of their respective data, and which caches contain cache lines with obsolete data that needs to be updated before it can be used.

In one embodiment, control logic 130 enables efficient cache coherency by reading one or more modified cache lines from a first dedicated cache and writing them back to a second dedicated cache so that the second dedicated cache will have the latest version of the associated data. Dedicated caches 121–123 are connected to control logic 130 through write-back lines 151–153, respectively. While in one embodiment, write-back lines 151–153 are unidirectional lines to transfer modified data from a dedicated cache to control logic 130, in another embodiment write-back lines 151–153 may be bi-directional. Write-back lines 151–153 maybe substantially independent of each other so that data may be transferred over more than one of the write-back lines 151–153 at the same time. Dedicated caches 121–123 are also connected to control logic 130 through supply lines 154–156, respectively. While in one embodiment, supply lines 154–156 are unidirectional lines to transfer modified data from control logic 130 to a dedicated cache, in another embodiment supply lines 154–156 may be bi-directional. Supply lines 154–156 maybe substantially independent of each other so that data may be transferred over more than one of supply line 154–156 at the same time.

In one embodiment, control logic 130 is coupled to shared cache 150, dedicated caches 121–123, and I/F 180 to facilitate one or more of the following exemplary transfers of data: 1) from any of dedicated caches 121–123 to any other of dedicated caches 121–123, 2) from any of dedicated caches 121–123 to shared cache 150, 3) from shared cache 150 to any of dedicated caches 121–123, and 4) from an off-chip device to/from any of dedicated caches 121–123.

In some embodiments, coherency unit 140 and caches 121–123, 150 follow a form of Modified-Exclusive-Shared-Invalid (MESI) protocol. In this protocol, each cache line has a pair of bits, or other flag, to identify which of the four states (M, E, S, or I) the cache line is currently in within that specific cache. This protocol allows a quick determination of whether a requested cache line in a specific cache is coherent with the same cache lines in other caches, and therefore whether the requested cache line needs to be updated. In an exemplary operation, the protocol is used in the following manner: 1) if a processor experiences a cache miss in its dedicated cache (the requested line is not present or is present in an Invalid state), the request proceeds to the shared cache; 2) if the requested line is in the shared cache in an Exclusive or Modified state, this indicates the cache line may be in one of the other dedicated caches in a Modified state, and coherency unit 140 sends probes to all the dedicated caches; 3) if one of the dedicated caches responds with a hit, that dedicated cache transfers the cache line to the requesting processor, while if no dedicated cache responds with a hit, the request may be satisfied from the shared cache; 4) whether the shared cache is updated from the responding dedicated cache depends on the coherency policy being used in the system.

In one embodiment, coherency unit 140 maintains coherency not only between dedicated caches 121–123 and shared cache 150, but also between all the caches and main memory 194. If the requested cache line is not resident in shared cache 150 or in any of the dedicated caches 121–123, the requested cache line may be provided to the requesting processor and its dedicated cache from main memory 194. Depending on the coherency policy being implemented, shared cache 150 may also be updated with the requested cache line so that subsequent requests for that cache line may be provided more quickly than is possible from main memory.

Coherency unit 140 and control logic 130 may be implemented in various forms, including but not limited to: 1) discrete logic, 2) one or more state machines, and 3) firmware. In one embodiment, control logic 130 includes separate control circuits to handle write-back operations for each of dedicated caches 121–123 separately. In another embodiment, control logic 130 uses a single control circuit to handle write-back operation for all caches in an integrated manner.

Figure 2:
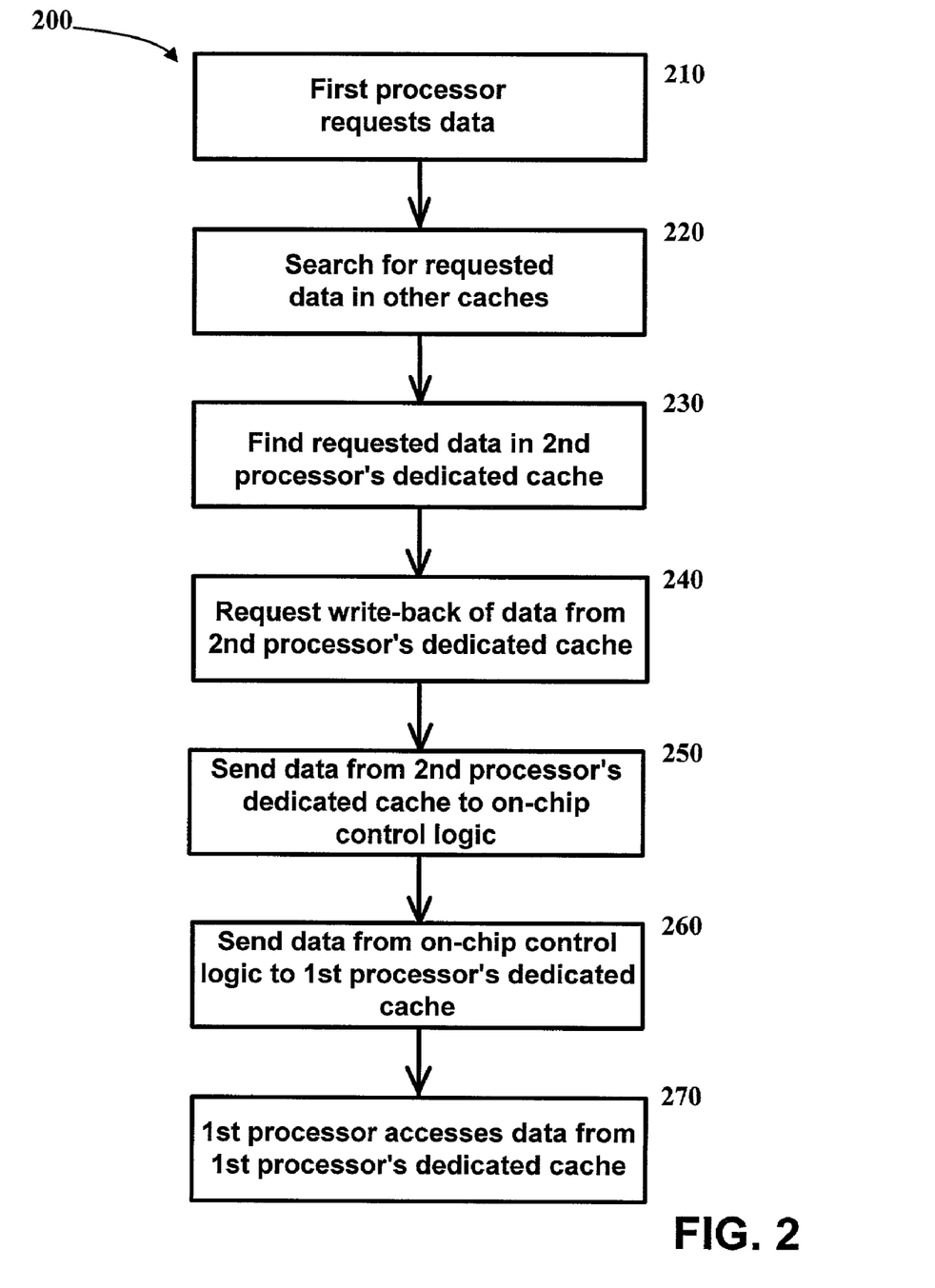
FIG. 2 shows a flow chart of the operation of the system of FIG. 1, according to one embodiment of the invention

FIG. 2 shows a flow chart of the operation of the system of FIG. 1, according to one embodiment of the invention. In the following paragraphs, the operational description of flow chart 200 in FIG. 2 makes reference to the components of FIG. 1. In particular, to illustrate an exemplary operation, the first and second processors of FIG. 2 are described in terms of processors 111 and 112, respectively, in FIG. 1. However, FIG. 2 may include operations implemented in structures other than that shown in FIG. 1, while FIG. 1 may include structure that implements operations other than that shown in FIG. 2. In the illustrated example of FIG. 2, an operation begins at block 210 when a first processor 112 makes a request for data at a specific address. If the data corresponding to the address is not found in the first processor's dedicated cache in a valid state, the other caches are probed at block 220 to determine if the requested data is there, and if so, whether the data has been modified. In one embodiment, snoop probes are issued to the various caches through lines 141–143, 148 in response to the request for data. In another embodiment, snoop probes are issued through lines 141–143, 148 periodically without waiting for a data request, so the location and MESI status of each cache line in each location may be known by coherency unit 140 in advance. Snoop probes are also issued to external memory through line 149. Regardless of how snoop operations are conducted, if either of the following conditions is true, the operation continues at block 230: 1) the requested data exists in the dedicated cache of a second processor but not in the dedicated cache of the first processor, or 2) the requested data exists in the dedicated cache of the second processor in a modified form and in the dedicated cache of the first processor in an unmodified form (e.g., the second processor's dedicated cache has a more recent version of the data). If neither of the above conditions exists, the data may be retrieved through other methods not covered by FIG. 2 and not described herein.

In the exemplary operation described herein, it is assumed that at block 230 the data at the requested address is found in the data's most recent form in the dedicated cache 122 of the second processor 112, but not in the dedicated cache 121 of the first (requesting) processor 111, and therefore the data needs to be transferred from the dedicated cache 122 to the dedicated cache 121 so the data can be read and operated upon by first processor 111. At block 240, a request is sent to write back the data from the dedicated cache 122. This request may take any convenient form, including but not limited to: 1) a signal, 2) a command, and 3) a message. At block 250, the data is sent over write-back line 152 from the dedicated cache 122 of the second processor to the control logic 130, which in one embodiment is located on the same chip as the dedicated caches 121 and 122. At block 260, the data is sent over supply line 154 from the control logic 130 to the dedicated cache 121 of the first processor, where it can be accessed and acted upon by the first processor 111 at block 270. In an exemplary operation, data is transferred in units of one cache line.

Although the exemplary operation described pertains to a write-back operation from cache 122 to cache 121, similar write-back operations can be performed between any two of the dedicated caches 121–123. In one embodiment, two separate write-back operations (e.g., a first operation from dedicated cache 122 to dedicated cache 121 and a second operation from dedicated cache 121 to dedicated cache 122) may be performed at least partially at the same time.

External devices can also initiate memory operations and generally need the most recent version of data, so snoop operations may be initiated from off-chip. While a cache miss from one of dedicated processors 111–113 may trigger an internal snoop probe (initiated from within CMP 100), a cache miss from an off-chip device may trigger an external snoop probe (initiated from outside CMP 100). In one embodiment, the coherency unit 140 arbitrates between internal and external snoop probes to maintain overall memory coherency. When coherency unit 140 cannot accept any more snoop requests, e.g., when its probe queues are full, it may block any more snoop requests until it is again able to receive another snoop request.

In some circumstances, a cache line that is requested (block 240 of FIG. 2) for a write-back is being victimized (i.e., deallocated to make room for a new cache entry) at the time of the request. In one embodiment, this situation is handled by canceling the write-back request. Once a victim write-back (writing the latest version of the data to shared cache or main memory) has been completed as part of the victimization, the requested data may be re-requested. In other embodiments, this situation may be handled in other ways.

Figure 3:
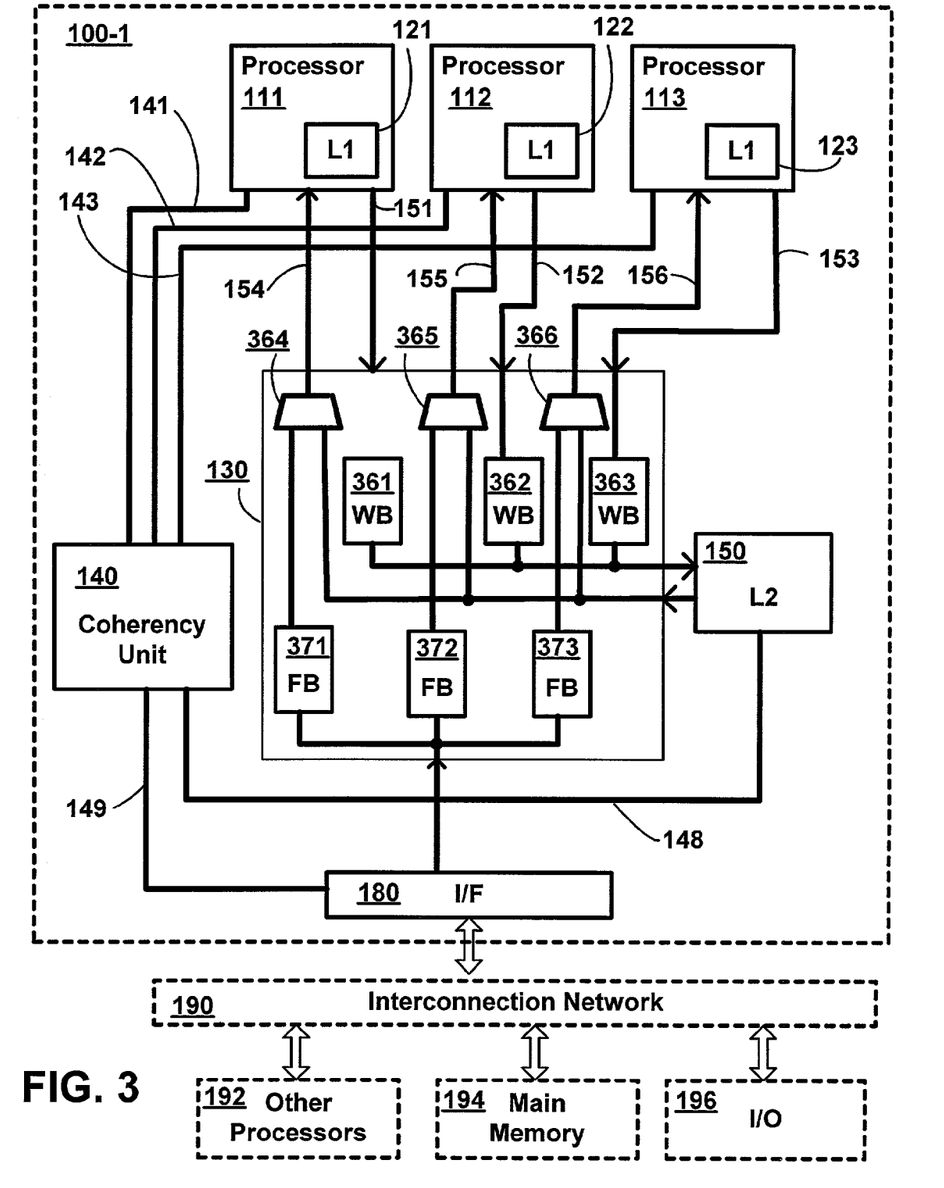
FIG. 3 shows a block diagram of a multi-core system using write buffers, according to one embodiment of the invention.

FIG. 3 shows a block diagram of a multi-core system using write buffers, according to one embodiment of the invention. CMP 100-1 of the illustrated embodiment of FIG. 3 is a specific implementation of the more generalized CMP 100 of FIG. 1. In the embodiment of FIG. 3, control logic 130 includes write buffers 361–363 coupled between dedicated caches 151–153, respectively, and shared cache 150 to facilitate transferring write-back data from any of the dedicated caches 151–153 to the shared cache 150. Once data has been transferred into shared cache 150 from a first dedicated cache, it may be transferred from shared cache 150 to a second dedicated cache without requiring any off-chip transfers. While in the embodiment shown in FIG. 3, control logic 130 also includes fill buffers 371–373 and multiplexers 364–366 to facilitate writing data into dedicated caches 121–123 from off-chip devices (such as main memory 194), other embodiments need not implement fill buffers.

Figure 4:
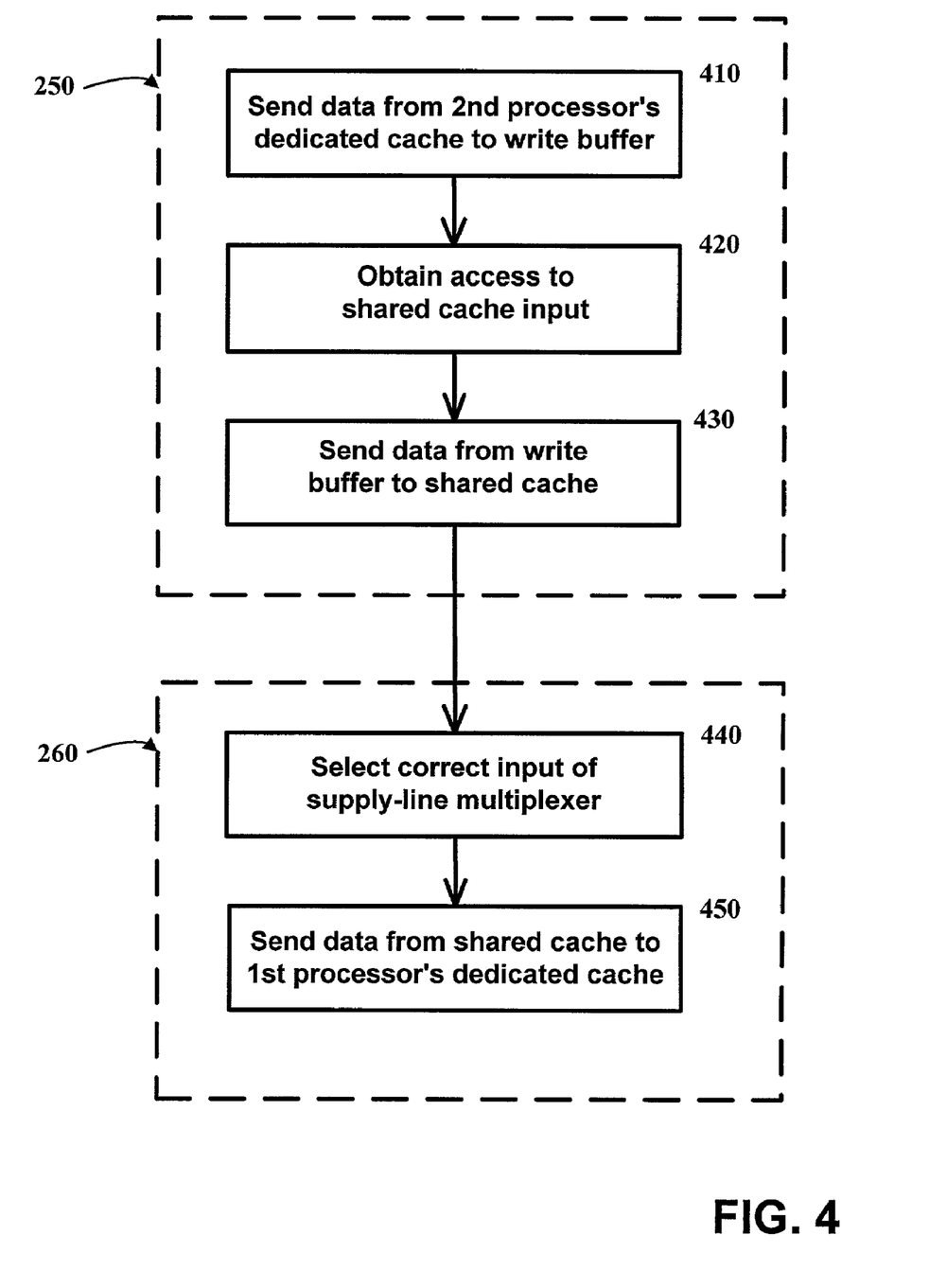
FIG. 4 shows a flow chart of the operation of the system of FIG. 3, according to one embodiment of the invention.

FIG. 4 shows a flow chart of the operation of the system of FIG. 3, according to one embodiment of the invention. In the following paragraphs, the operational description of FIG. 4 makes reference to the components of FIG. 3. In particular, to illustrate an exemplary operation, the first and second processors of FIG. 4 are described in terms of processors 111 and 112, respectively, in FIG. 3. However, FIG. 4 may include operations implemented in structures other than that shown in FIG. 3, while FIG. 3 may include structure that implements operations other than that shown in FIG. 4. Since the embodiment of FIG. 4 incorporates a specific write-back operation of the general embodiment of FIG. 2, only the write-back operation (blocks 250, 260 of FIG. 2) is described for FIGS. 3, 4. The remainder of a complete operation may be the same as described for FIGS. 1, 2. The exemplary operation described is for a write-back from dedicated cache 122 to dedicated cache 121. As will be appreciated by those of skill in the art, a similar write-back may be performed between any two of the dedicated caches 121–123.

At block 410, the data from the second processor's dedicated cache 122 is transferred to write buffer 362 over write-back line 152. In one embodiment, each write buffer includes enough storage capacity to store an entire cache line. In other embodiments, each write buffer may include more or less than a cache line of storage capacity. While the write buffers may be implemented in any number of ways, in a particular embodiment each write buffer includes a first-in first-out (FIFO) buffer. Handshaking control circuitry (not shown) may be used to prevent dedicated cache 122 from overrunning the storage capacity of write buffer 362. While in the embodiment shown, the outputs of all write buffers 361–363 are connected to shared cache 150 through a common bus, in another embodiment the outputs of all write buffers 361–363 may be connected to shared cache 150 through multiplexed data paths rather than through a common bus.

At block 420, write buffer 362 obtains access to the input of shared cache 150 by arbitrating to obtain use of the common bus. At block 430, write buffer 362 sends the data to shared cache 150.

In the embodiment of FIG. 3, a separate write buffer is provided for each dedicated cache so that multiple dedicated caches may provide write-back data at the same time. In another embodiment (not shown), a single write buffer is provided to receive data from all the dedicated caches.

At block 440, the right-hand input (as shown in FIG. 3) of supply-line multiplexer 364 is selected so that dedicated cache 121 can receive data from shared cache 150. At block 450, the data that was written to shared cache 150 in block 430 is now written from shared cache 150 to dedicated cache 121. This completes the transfer of data from dedicated cache 122 to dedicated cache 121.

In the illustrated embodiment, write buffers 361–363 provide buffering for data being transferred between dedicated caches on-chip, while fill buffers 371–373 provide buffering for data being written into dedicated caches 121–123 from off-chip. Data from main memory 194 or from some other off-chip device may be written to one or more of fill buffers 371–373, from where the data may be selected by the associated multiplexers 364–366 to be written into dedicated cache. In one embodiment, each fill buffer 371–373 includes multiple slots, one for each pending data request. In one embodiment, each slot includes enough storage capacity to store an entire cache line. In other embodiments, each slot may contain more or less than one cache line of storage space.

Figure 5:
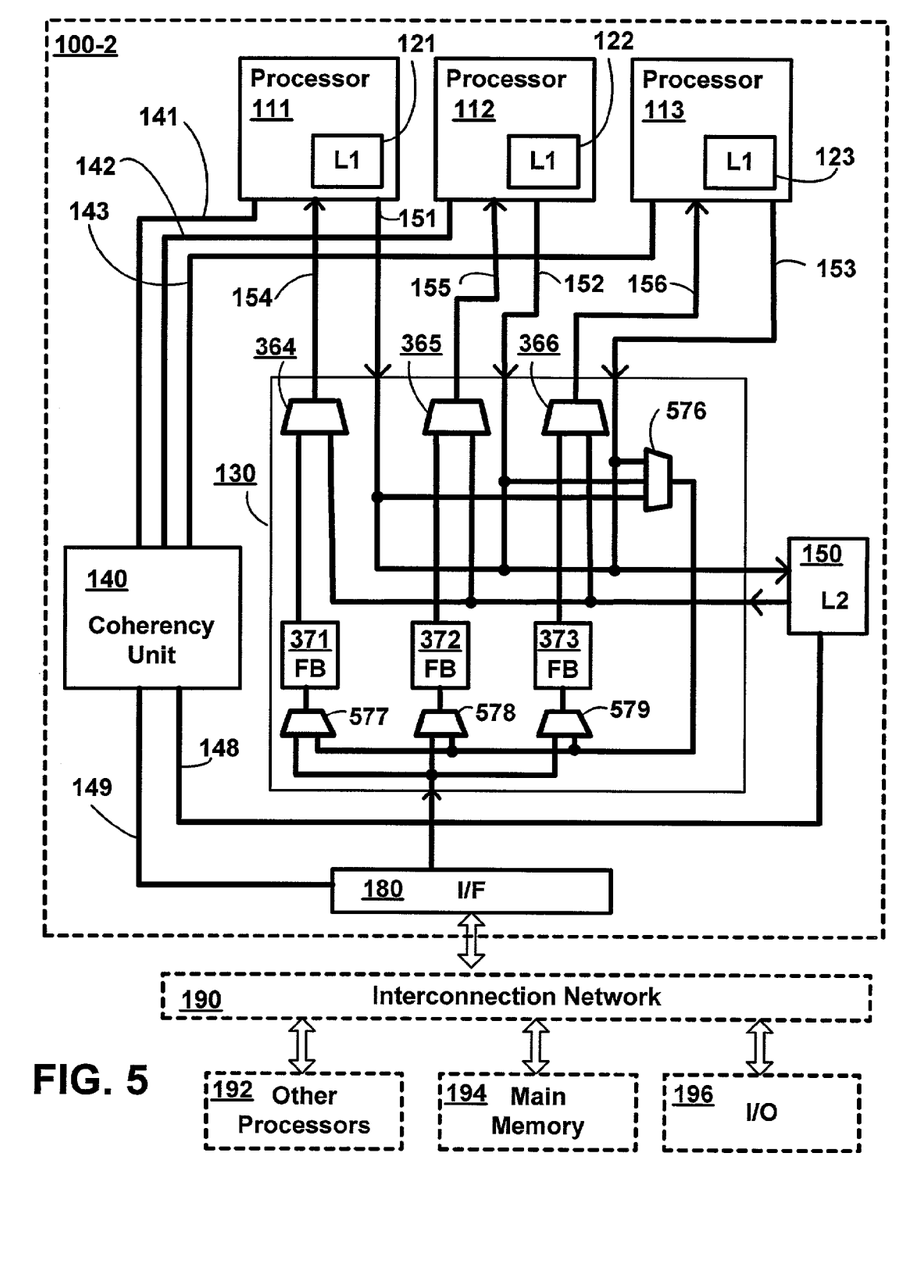
FIG. 5 shows a block diagram of a multi-core system using a fill buffer, according to one embodiment of the invention.

FIG. 5 shows a block diagram of a multi-core system using fill buffers, according to one embodiment of the invention. CMP 100-2 of the illustrated embodiment of FIG. 5 is a specific implementation of the more generalized CMP 100 of FIG. 1. In the embodiment of FIG. 5, control logic 130 includes multiplexers 576–579 to route write-back data from one dedicated cache to another dedicated cache through fill buffers 371–373. In the illustrated embodiment, write-back lines 151–153 are coupled to multiplexer 576 so that the write-back data from any dedicated cache can be routed to multiplexers 577–579. Multiplexers 577–579 are coupled to fill buffers 371–373, respectively, to select whether one or more of fill buffers 371–373 receives data from a dedicated cache through multiplexer 576 or from an external device through I/F 180. As in FIG. 3, fill buffers 371–373 provide the data to multiplexers 364–366, respectively, which select whether dedicated caches 151–153 receive data from fill buffers 371–373 or from shared cache 150. In the illustrated embodiment, each dedicated cache has a separate fill buffer associated with it. In another embodiment (not shown), a single fill buffer is used to provide data to all the dedicated caches, with additional logic to route the data to the intended dedicated cache during a specific data transfer.

Figure 6:
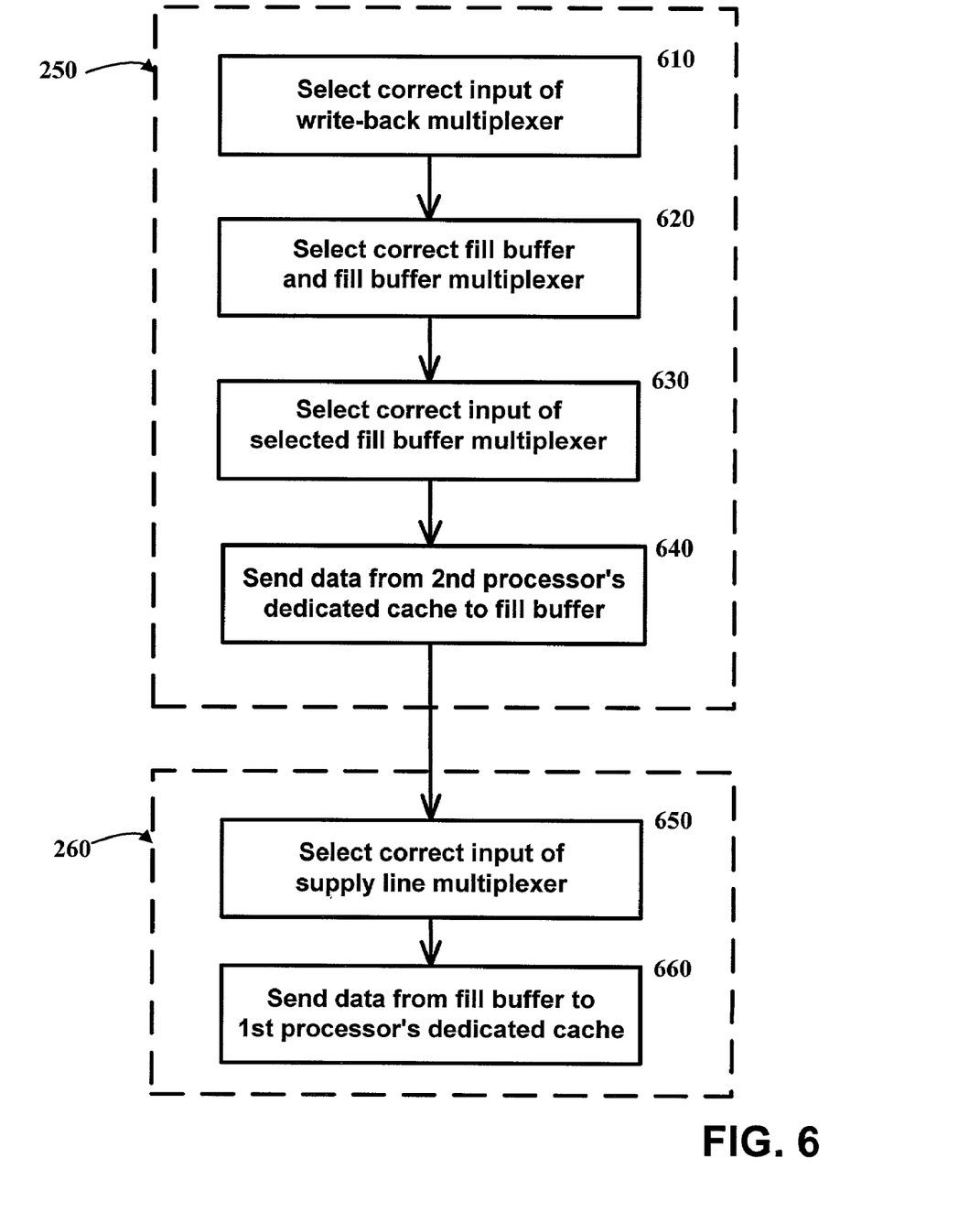
FIG. 6 shows a flow chart of the operation of the system of FIG. 5, according to one embodiment of the invention.

FIG. 6 shows a flow chart of the operation of the system of FIG. 5, according to one embodiment of the invention. In the following paragraphs, the operational description of FIG. 6 makes reference to the components of FIG. 5. In particular, in an exemplary operation, the first and second processors of FIG. 6 are described in terms of processors 111 and 112, respectively, in FIG. 5. However, FIG. 6 may include operations implemented in structures other than that shown in FIG. 5, while FIG. 5 may include structure that implements operations other than that shown in FIG. 6. Since the embodiment of FIG. 6 incorporates a specific write-back operation of the general embodiment of FIG. 2, only the write-back operation (blocks 250, 260 of FIG. 2) is described for FIGS. 5, 6. The remainder of a complete operation may be the same as described for FIG. 2. As before, the exemplary operation described is for a write-back from dedicated cache 122 to dedicated cache 121. As will be appreciated by those of skill in the art, a similar write-back may be performed between any two of the dedicated caches 121–123.

At block 610, the middle input (as seen in FIG. 5) of multiplexer 576 is selected so that data on write-back line 152 will be passed through to the output of multiplexer 576 and on to the inputs of multiplexers 577–579. At block 620, fill buffer 371 and/or fill buffer multiplexer 577 are selected to receive data, while the remaining fill buffers and/or fill buffer multiplexers are deselected. In one embodiment, a control signal to fill buffer 371 directs fill buffer 371 to read and store whatever data is presented by fill buffer multiplexer 577. In another embodiment, a control signal enables the output of fill buffer multiplexer 577. At block 630, the right-hand input (as shown in FIG. 5) of fill buffer multiplexer 577 is selected, so that the output of multiplexer 576 will be passed on to fill buffer 371. At block 640, the data from dedicated cache 122 is sent through multiplexers 576 and 577 to fill buffer 371, where the data is temporarily stored. In one embodiment, the fill buffers of FIG. 5 include the same variations and embodiments as described for the fill buffers of FIG. 3.

At block 650, the left-hand input (as seen in FIG. 5) of supply-line multiplexer 364 is selected, so that the output of fill buffer 371 will be passed therethrough. At block 660, the data from dedicated cache 122 that was previously written into fill buffer 371 is written from fill buffer 371 into dedicated cache 121. This completes the transfer of data from dedicated cache 122 to dedicated cache 121.

Figure 7:
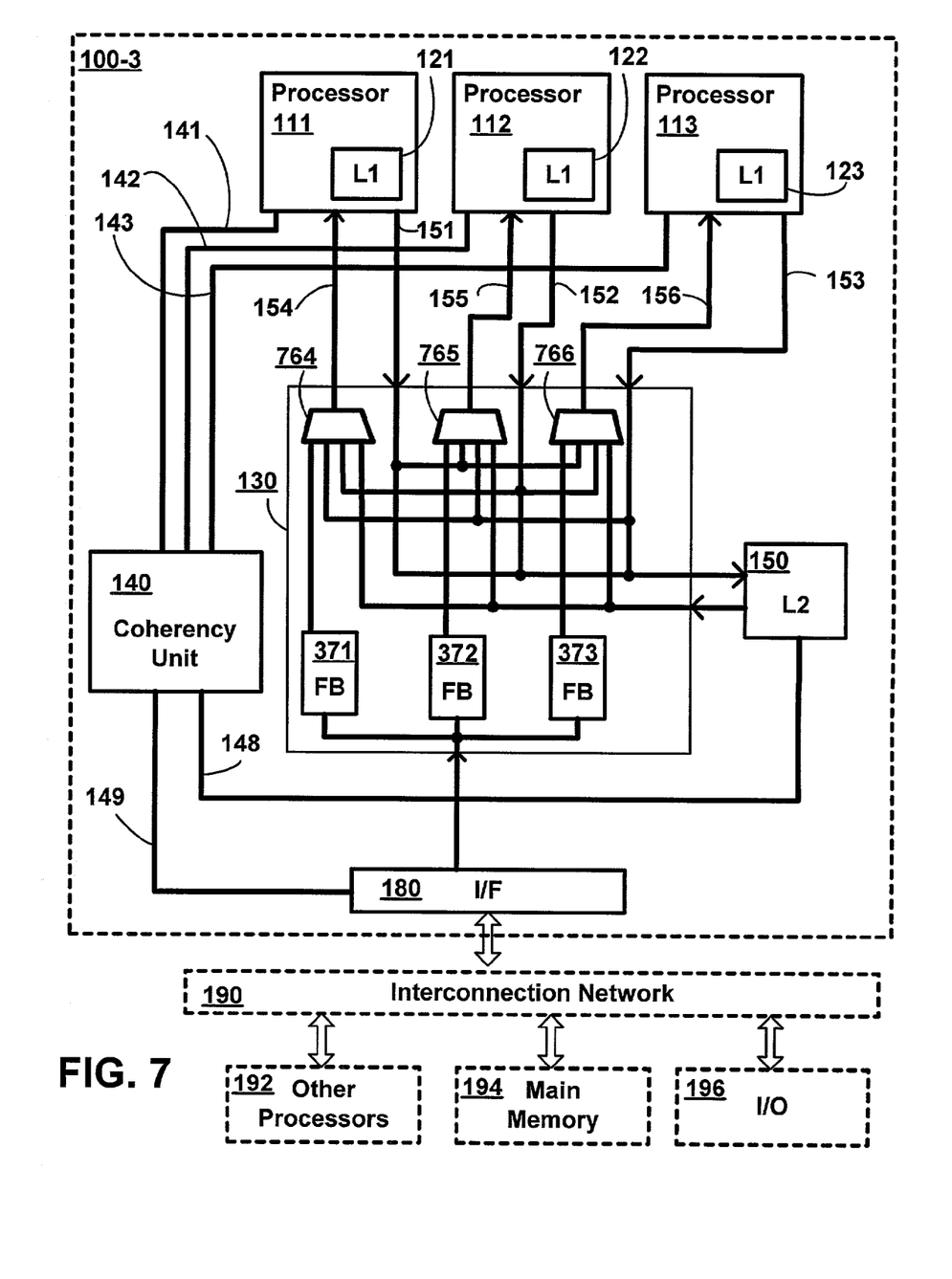
FIG. 7 shows a block diagram of a multi-core system using a multiplexer, according to one embodiment of the invention.

FIG. 7 shows a block diagram of a multi-core system using multiplexers, according to one embodiment of the invention. CMP 100-3 of the illustrated embodiment of FIG. 7 is a specific implementation of the more generalized CMP 100 of FIG. 1. In the embodiment of FIG. 7, control logic 130 includes multiplexers to route data from one dedicated cache to another dedicated cache by routing data directly from the write-back line of one dedicated cache to the supply line of another dedicated cache. Each of write-back multiplexers 764–766 has an output to its associated dedicated cache, an input from shared cache 150, an input from associated fill buffer 371–373, and inputs from each of the other write-back lines.

Figure 8:
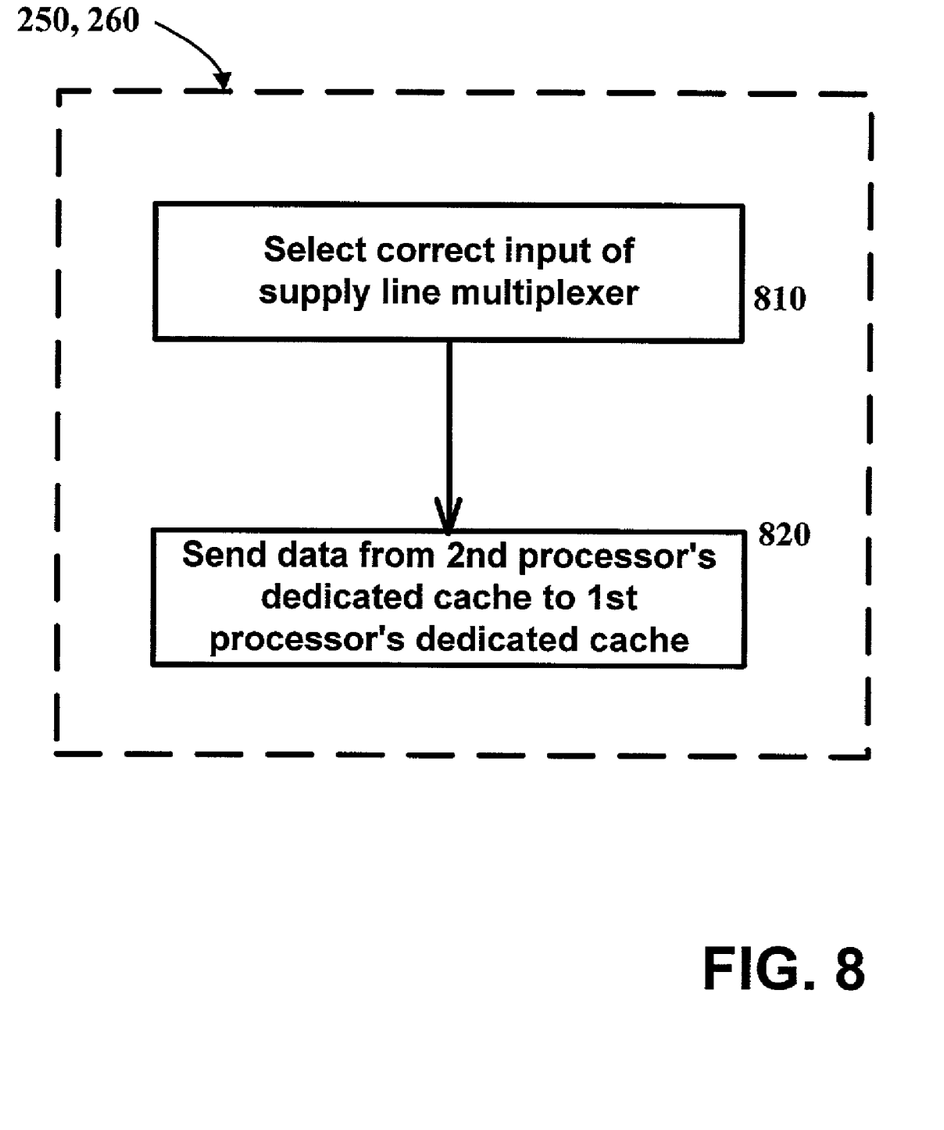
FIG. 8 shows a flow chart of the operation of the system of FIG. 7, according to one embodiment of the invention.

FIG. 8 shows a flow chart of the operation of the system of FIG. 7, according to one embodiment of the invention. In the following paragraphs, the operational description of FIG. 8 makes reference to the components of FIG. 7. In particular, in an exemplary operation, the first and second processors of FIG. 8 are described in terms of processors 111 and 112, respectively, in FIG. 7. However, FIG. 8 may include operations implemented in structures other than that shown in FIG. 7, while FIG. 7 may include structure that implements operations other than that shown in FIG. 8. Since the embodiment of FIG. 8 incorporates a specific write-back operation of the general embodiment of FIG. 2, only the write-back operation (blocks 250, 260 of FIG. 2) is described for FIGS. 7, 8. The remainder of a complete operation is the same as described for FIG. 2. As before, the exemplary operation described is for a write-back from dedicated cache 122 to dedicated cache 121. As will be appreciated by those of skill in the art, a similar write-back may be performed between any two of the dedicated caches 121–123.

At block 810, the second input from the right (as viewed in FIG. 7) of supply line multiplexer 764 is selected, thus connecting the write-back line 152 directly to the supply line 154. At block 820, data is sent from dedicated cache 122 to dedicated cache 121 through supply line multiplexer 764. This completes the transfer of data from dedicated cache 122 to dedicated cache 121.

In one embodiment, there is no data buffer between dedicated caches 122 and 121, so handshaking logic is included to control timing constraints required by both dedicated caches.

The invention may be implemented in one or a combination of hardware, firmware, and software. The invention may also be implemented as instructions stored on a machine-readable medium, which may be read and executed by at least one processor to perform the operations described herein. A machine-readable medium may include any mechanism for storing or transmitting information in a form readable by a machine (e.g., a computer). For example, a machine-readable medium may include read only memory (ROM); random access memory (RAM); magnetic disk storage media; optical storage media; flash memory devices; electrical, optical, acoustical or other form of propagated signals (e.g., carrier waves, infrared signals, digital signals, etc.), and others.

Figure 9:
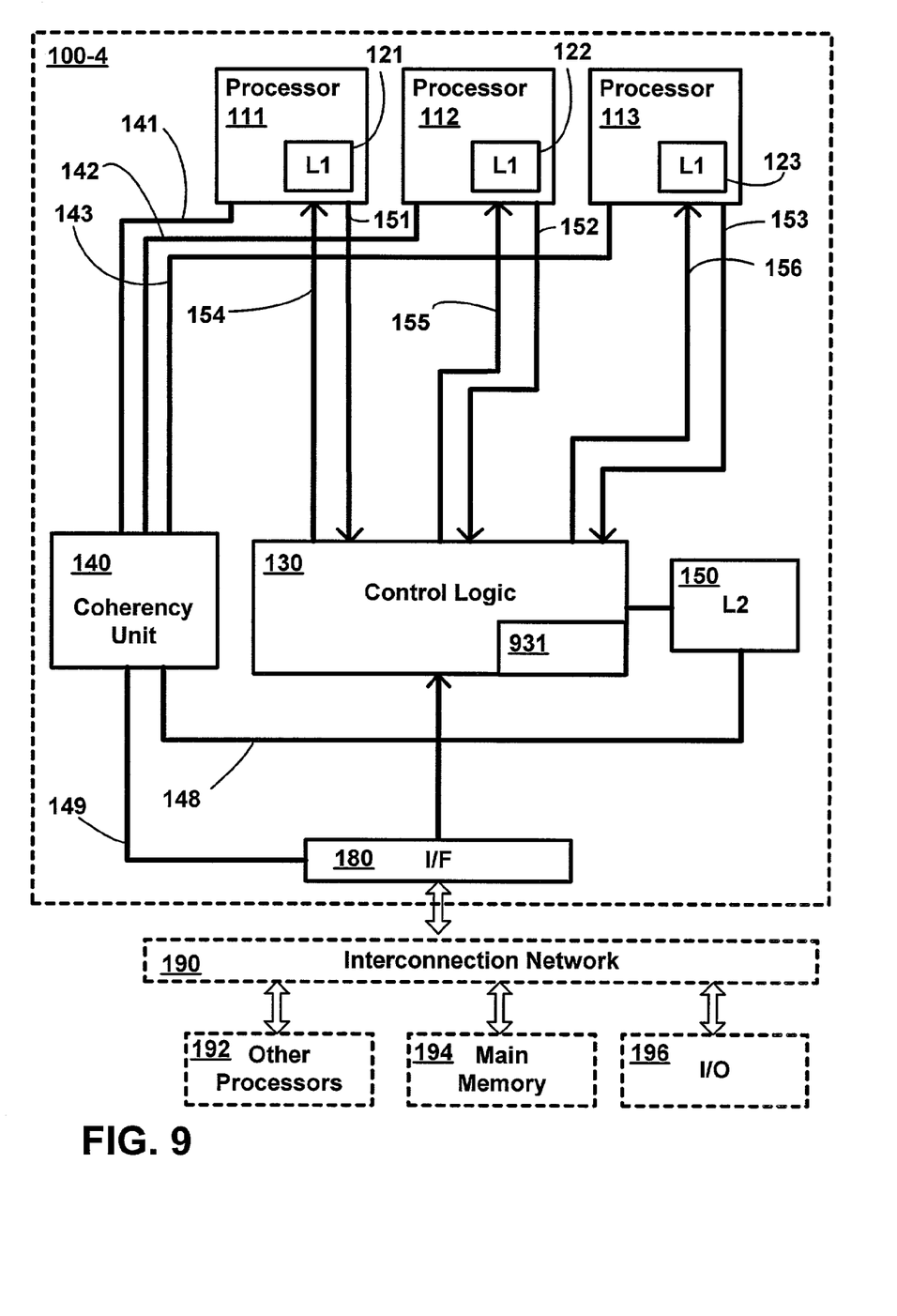
FIG. 9 shows a block diagram of a multi-core system using instructions to control cache write-back operations, according to one embodiment of the invention.

FIG. 9 shows a block diagram of a multi-core system using instructions to control cache write-back operations, according to one embodiment of the invention. The instructions may be implemented as code to route data from one dedicated cache to another dedicated cache. In one embodiment, the code may be implemented as program code. In another embodiment, the code may be implemented as contents of a state machine. CMP 100-4 of the illustrated embodiment of FIG. 9 is a specific implementation of the more generalized CMP 100 of FIG. 1.

In the illustrated embodiment of FIG. 9, code 931 is a part of control logic 130. In another embodiment, code 931 is part of a larger block of control code external to control logic 130 that implements more operations than the transfer of data between dedicated caches. Although shown as a part of CMP 100, code 931 may also be contained in any of the media previously described. In various embodiments, each of the operations described in FIGS. 2, 4, 6, and 8 may be executed by code 931.

The foregoing description is intended to be illustrative and not limiting. Variations will occur to those of skill in the art. Those variations are intended to be included in the invention, which is limited only by the spirit and scope of the appended claims.

We claim:

1. An apparatus, comprising:
an integrated circuit including:
a first processor with a first dedicated cache;
a second processor with a second dedicated cache; and
control logic, coupled to the first and second dedicated caches, having:
a first multiplexer coupled to the first and second caches to receive a first cache line from the first dedicated cache and to provide the first cache line to the second dedicated cache; and
a second multiplexer coupled to the first and second caches to receive a second cache line from the second dedicated cache and to provide the second cache line to the first dedicated cache.

2. The apparatus of claim 1, wherein:
the control logic is to transfer the first cache line if the first cache line is a cache line in the first dedicated cache and not in the second dedicated cache.

3. The apparatus of claim 1, wherein:
the control logic is to transfer the first cache line if the first cache line is a modified version of a particular cache line and the second dedicated cache contains an unmodified version of the particular cache line.

4. The apparatus of claim 1, further comprising:
a coherency unit to perform snoop operations on the first and second dedicated caches.

5. The apparatus of claim 1, wherein the integrated circuit further includes:
a shared cache coupled to the control logic, to the first dedicated cache, and to the second dedicated cache;
wherein the control logic is further to transfer a second cache line from the second dedicated cache to the first dedicated cache;
wherein the control logic includes a first write buffer to receive the first cache line from the first dedicated cache and to provide the first cache line to the shared cache, and further includes a second write buffer to receive the second cache line from the second dedicated cache and provide the second cache line to the shared cache;
wherein the shared cache is to provide the first cache line to the second dedicated cache and to provide the second cache line to the first dedicated cache.

6. An apparatus, comprising:
an integrated circuit including:
a first processor with a first dedicated cache;
a second processor with a second dedicated cache; and
control logic, coupled to the first and second dedicated caches, having:
a first fill buffer coupled to the first and second dedicated caches to receive a first cache line from the first dedicated cache and to provide the first cache line to the second dedicated cache; and
a second fill buffer coupled to the first and second dedicated caches to receive a second cache line from the second dedicated cache and to provide the second cache line to the first dedicated cache.

7. The apparatus of claim 6, further comprising:
a coherency unit to perform snoop operations on the first and second dedicated caches.

8. The apparatus of claim 6, wherein the integrated circuit further includes:
a shared cache coupled to the control logic, to the first dedicated cache, and to the second dedicated cache;
wherein the control logic is further to transfer a second cache line from the second dedicated cache to the first dedicated cache;
wherein the control logic includes a first write buffer to receive the first cache line from the first dedicated cache and to provide the first cache line to the shared cache, and further includes a second write buffer to receive the second cache line from the second dedicated cache and provide the second cache line to the shared cache;
wherein the shared cache is to provide the first cache line to the second dedicated cache and to provide the second cache line to the first dedicated cache.

9. A method, comprising:
transferring a first cache line directly from a first dedicated cache of a chip multi-processor to a first multiplexer within control logic coupled to the first cache in the chip multi-processor;
subsequently transferring the first cache line from the first multiplexer directly to a second dedicated cache of the chip multi-processor,
transferring a second cache line directly from the second dedicated cache to a second multiplexer within the control logic coupled to the second cache in the chip multi-processor; and
subsequently transferring the second cache line from the second multiplexer directly to the first dedicated cache.

10. A method, comprising:
transferring a first cache line directly from a first dedicated cache of a chip multi-processor to a first write buffer within control logic coupled to the first cache in the chip multi-processor;
subsequently transferring the first cache line from the first write buffer directly to a second dedicated cache of the chip multi-processor,
transferring a second cache line directly from the second dedicated cache to a second write buffer within the control logic coupled to the second cache in the chip multi-processor; and
subsequently transferring the second cache line from the second write buffer directly to the first dedicated cache.

11. A system, comprising:
a main memory,
a chip multiprocessor coupled to the main memory and including:
a first processor with a first dedicated cache;
a second processor with a second dedicated cache; and
control logic, coupled to the first and second dedicated caches, having:
a first multiplexer coupled to the first and second caches to receive a first cache line from the first dedicated cache and to provide the first cache line to the second dedicated cache; and a second multiplexer coupled to the first and second caches to receive a second cache line from the second dedicated cache and to provide the second cache line to the first dedicated cache.

12. The system of claim 11, wherein the chip multiprocessor further comprises:

a coherency unit to perform snoop operations on the first and second dedicated caches.

13. The system of claim 11, wherein the chip multiprocessor further includes:

a shared cache coupled to the control logic and to the second dedicated cache to provide the first cache line to the second dedicated cache;

wherein the control logic includes a write buffer to receive the first cache line from the first dedicated cache and to provide the first cache line to the shared cache.

* * * * *